United States Patent
Sherrer et al.

(10) Patent No.: US 9,570,787 B2
(45) Date of Patent: Feb. 14, 2017

(54) HOLLOW CORE COAXIAL CABLES AND METHODS OF MAKING THE SAME

(71) Applicant: Nuvotronics, LLC, Radford, VA (US)

(72) Inventors: David W. Sherrer, Cary, NC (US); Noel Heiks, Cary, NC (US)

(73) Assignee: Nuvotronics, Inc., Radford, VA (US)

( * ) Notice: Subject to any disclaimer, the term of this patent is extended or adjusted under 35 U.S.C. 154(b) by 0 days.

(21) Appl. No.: 14/804,203

(22) Filed: Jul. 20, 2015

(65) Prior Publication Data

US 2016/0254583 A1    Sep. 1, 2016

Related U.S. Application Data

(63) Continuation of application No. 13/183,409, filed on Jul. 14, 2011, now Pat. No. 9,088,074.

(51) Int. Cl.
| | | |
|---|---|---|
| *H01B 5/14* | (2006.01) | |
| *H01P 3/127* | (2006.01) | |
| *H01B 7/02* | (2006.01) | |
| *G02B 6/44* | (2006.01) | |
| *H01Q 13/20* | (2006.01) | |
| *H01B 7/08* | (2006.01) | |
| *H01B 11/18* | (2006.01) | |
| *H01B 13/016* | (2006.01) | |
| *H01B 13/06* | (2006.01) | |
| *H01B 5/02* | (2006.01) | |

(52) U.S. Cl.
CPC .............. *H01P 3/127* (2013.01); *G02B 6/4415* (2013.01); *H01B 5/14* (2013.01); *H01B 7/0275* (2013.01); *H01B 7/08* (2013.01); *H01B 11/1834* (2013.01); *H01B 13/016* (2013.01); *H01B 13/06* (2013.01); *H01Q 13/203* (2013.01); *H01B 5/02* (2013.01); *H01B 7/02* (2013.01)

(58) Field of Classification Search
None
See application file for complete search history.

(56) References Cited

U.S. PATENT DOCUMENTS

| | | |
|---|---|---|
| 3,600,709 A | 8/1971 | Ditscheid |
| 4,139,936 A | 2/1979 | Abrams |
| 4,930,863 A | 6/1990 | Croitoriu |

(Continued)

OTHER PUBLICATIONS

Buric, Michael P., et al., "Multimode Metal-Lined Capillaries for Raman Collection and Sensing", J. Opt. Soc. Am. B/vol. 27, No. 12, Dec. 2010.

(Continued)

*Primary Examiner* — Dion R Ferguson
(74) *Attorney, Agent, or Firm* — Niels Haun; Dann, Dorfman, Herrell and Skillman, P.C.

(57) ABSTRACT

Disclosed and claimed herein is a hollow core coaxial cable, having a dielectric capillary with an inside wall and an outside wall, an inner conductive layer on the inside wall of the hollow core coaxial cable and an outer conductive layer on the outside wall of the hollow core coaxial cable, the conductive layers may be patterned. Further disclosed is a method of making the hollow core coaxial cable. Further disclosed are holey fiber coaxial cables, having a holey fiber capillary having an inside wall and an outside wall, an inner conductive layer on the inside wall of the hollow core coaxial cable and an outer conductive layer on the outside wall of the hollow core coaxial cable, the conductive layers may be patterned.

20 Claims, 10 Drawing Sheets

(56) References Cited

U.S. PATENT DOCUMENTS

| | | | |
|---|---|---|---|
| 5,006,825 | A | 4/1991 | Guilbert |
| 5,468,597 | A | 11/1995 | Calabrese |
| 5,726,214 | A | 3/1998 | Buckmaster |
| 5,828,007 | A | 10/1998 | Fujishita et al. |
| 6,343,172 | B1 | 1/2002 | Schiestle et al. |
| 6,982,384 | B2 | 1/2006 | Hall et al. |
| 7,332,676 | B2 | 2/2008 | Sparrowhawk |
| 7,737,362 | B2 | 6/2010 | Ogura |
| 8,050,527 | B2 | 11/2011 | Noddings |
| 8,063,307 | B2 | 11/2011 | Bukshpun et al. |
| 8,558,115 | B2 | 10/2013 | Jenner et al. |
| 2008/0078567 | A1 | 4/2008 | Miller et al. |
| 2008/0108122 | A1 | 5/2008 | Paul |
| 2010/0067918 | A1 | 3/2010 | Federici |
| 2011/0056724 | A1 | 3/2011 | Tanaka et al. |
| 2011/0209892 | A1 | 9/2011 | Metz et al. |

OTHER PUBLICATIONS

Harrington, Fiber and Integrated Optics, 19, 211-217 (2000). A Review of IR Transmitting, Hollow Waveguides.

Phuong, Journal of Microelectromechanical Systems, vol. 13, No. 3, Jun. 2004 p. 491 Photoresist Coating Methods for the Integration of Novel 3-D RF Microstructures.

Matsuura, J_ Opt. Soc. Am. A, vol. 14, No. 6/Jun. 1997. Hollow glass waveguides with three-layer dielectric coating fabricated by chemical vapor deposition.

Gallot, J_ Opt. Soc. Am. B, vol. 17, No. 5/May 2000, p. 851. Terahertz waveguides.

Mahfoud, 131.238.119.245/sarangan/courses/604/student_projects/mahfoud_project_03.pdf May 12, 2011 Photonic Crystal Fiber.

Shi, Applied Physics Letters 93, 153101 (2008) Inner wall coaled hollow core waveguide sensor based on double substrate surface enhanced Raman scattering.

Bandyopadhyay, web. njil. eduHederici/Research/THz/spie _ w _ waveguide_ 2006 .pdf Jan. 9, 2006 Characterization of Hollow Polycarbonate Metal waveguides using Terahertz lime domain spectroscopy.

Matsuu Ra, J. Opt. Soc. America, 0003·6935/95/306842·06806.00/0 (1995). Optical properties of small-bore hollow glass waveguides.

Harrington, Optics Express, Oct. 18, 2004/vol. 12, No. 21, Hollow polycarbonate waveguides with inner Cu coatings for delivery of terahertz radiation.

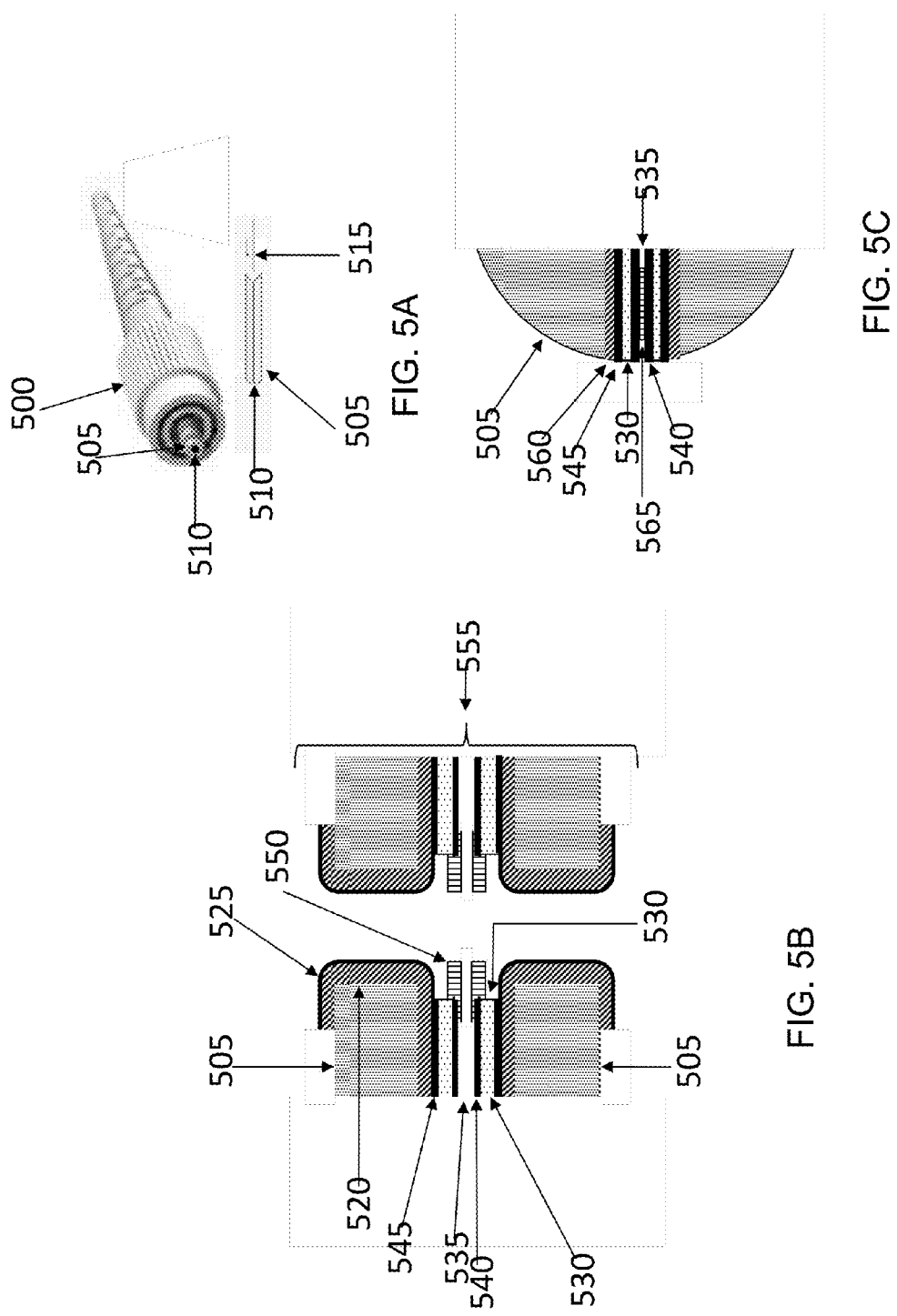

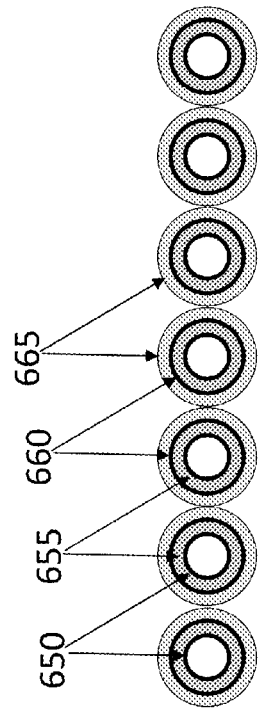
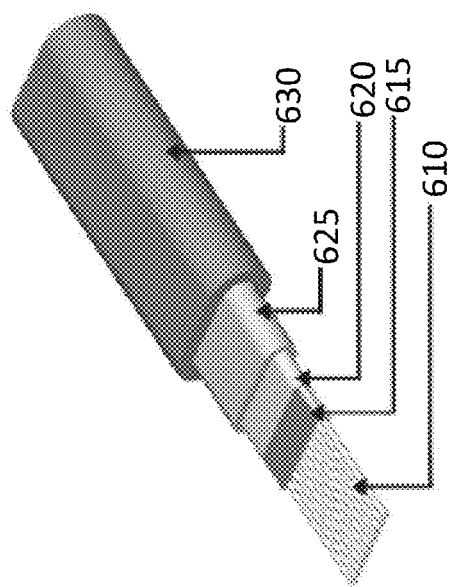
FIG. 6A
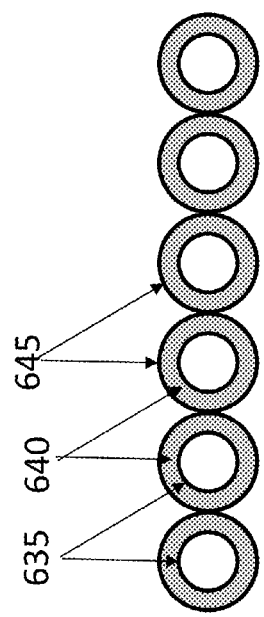
FIG. 6B
FIG. 6C

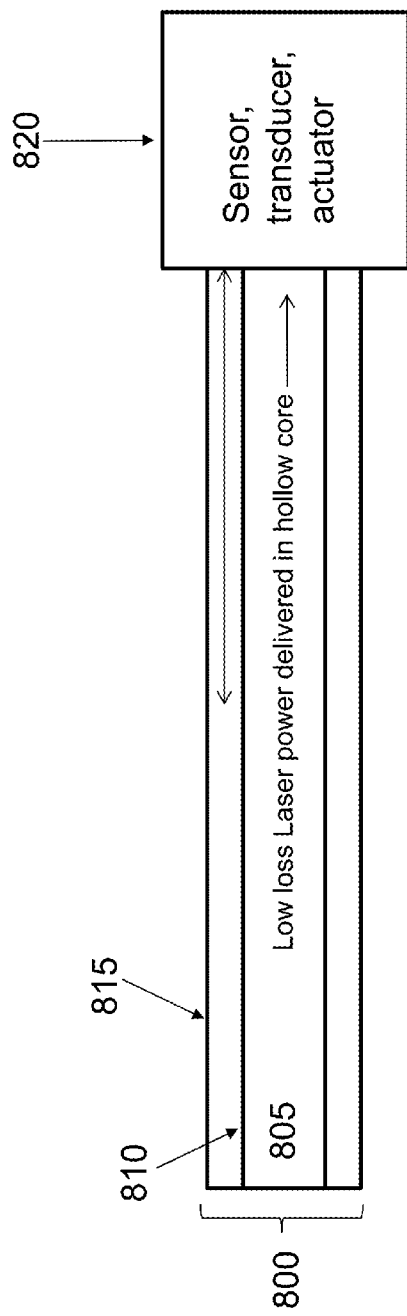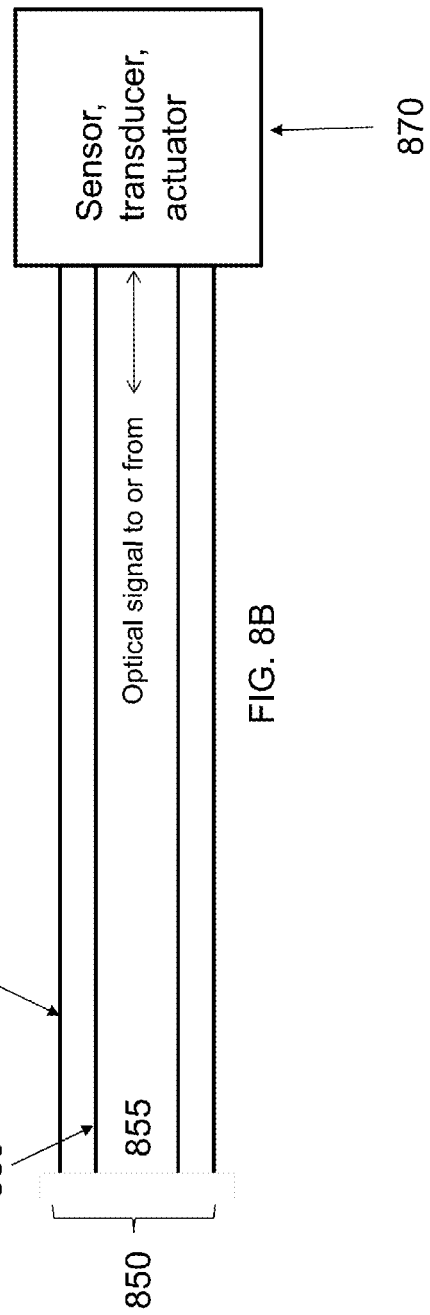

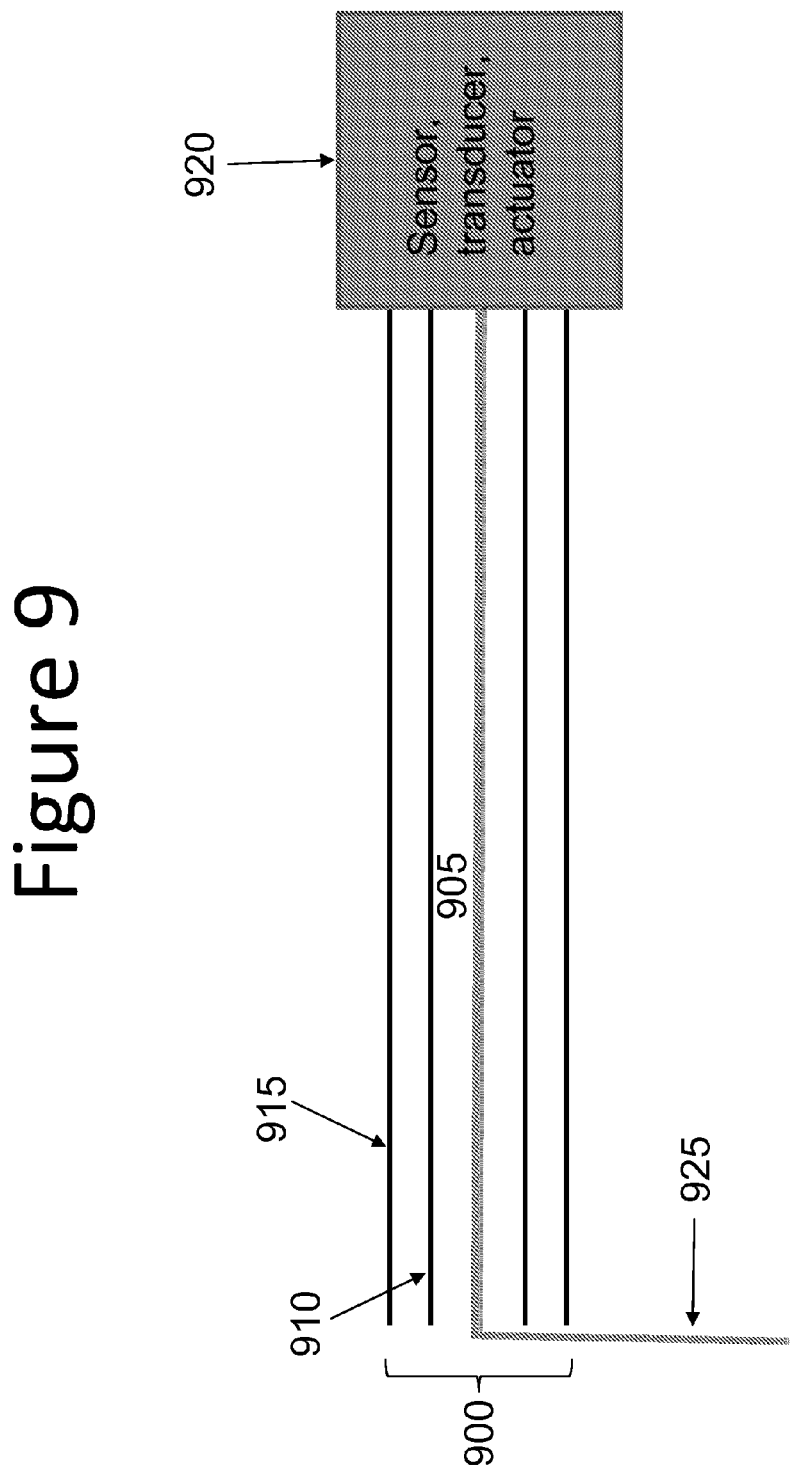

HOLLOW CORE COAXIAL CABLES AND METHODS OF MAKING THE SAME

RELATED APPLICATIONS

This application claims the benefit of priority of U.S. application Ser. No. 13/183,409, filed on Jul. 14, 2011, now U.S. Pat. No. 9,088,074, the entire contents of which application(s) are incorporated herein by reference.

FIELD OF THE INVENTION

This disclosure is in the field of high frequency coaxial cables capable of isolating and transmitting signals in the microwave and millimeter wavelength ranges. More particularly, described and claimed herein are hollow core coaxial cables and waveguides capable of transmitting such high frequency signals and a method of making the same.

BACKGROUND

Coaxial cables are typically manufactured by forming, over a center wire, a molded dielectric, and forming a braided outer conductor over the dielectric. Alternatively it may be manufactured by inserting a center wire conductor within a hollow braided wire (or some other flexible metal tubing) with spacers. The dielectric spacers or shielding that run down the length of the cable prevents electrical contact of the center conductor to the outer conductor and holds a pre-defined distance between the center conductor and the outer conductor. The electrical terminals of the center conductor and the outer conductor are typically connected to a source generating microwave signals or power in order to transmit electrical signals or energy effectively through the cable.

In such cables the center conductor is usually a solid wire. Cables with hollow conductors have been disclosed, for example, in Guilbert et al, U.S. Pat. No. 5,006,825 (1991), and Ditscheid et al, U.S. Pat. No. 3,600,709, (1971). However, the hollow core coaxial cables described in these patents tend to be large, inflexible, and expensive, and do not lend themselves easily to miniaturization. For applications where a very small diameter cable is required, the existing techniques do not scale down well in size, for example, to cable diameters below 2 mm, 1 mm, or 0.3 mm.

In addition, hollow glass waveguides for transmitting mid-infrared wavelengths of between 2.5-25 μm have been constructed based on hollow glass fibers having inner diameters of between 250-1000 μm with a conductor such as silver coated on the inside wall of the fiber at thicknesses from 0.2-0.4 μm. The conductor is then coated with thin layers of dielectric materials such as polyimides, aluminum oxide, titanium dioxide, silicon dioxide, zinc chalcogenides (oxides, sulfides, selenides, and tellurides) silicon nitride, compound semiconductors and various metal halogen compounds, including silver chloride, silver bromide and silver iodide. For example, Matsuura et al., in "Optical properties of small-bore hollow glass waveguides," Appl. Opt. 34, 6842 (1995), describes the formation of silver coatings onto the inside of glass capillaries having inner diameters as small as 250 μm and subsequently coating the silver layer with silver iodide. Croitoriu et al, U.S. Pat. No. 4,930,863 (1990) discloses essentially the same structure but larger and in tubes constructed of various polymers, including polyethylene, polytetrafluoroethylene, fluorinated ethylene-propylene, perfluoroalkoxy olefin as well as polyethylene, polypropylene, nylon 6, nylon 11, silicone rubber, rubber, polyvinyl chloride and polystyrene. However, these disclosed waveguides are hollow and do not have a central conductor with a metalized outer conductor surface separated by a dielectric and are therefore not coaxial nor in TEM (transverse electromagnetic mode). Hollow core waveguide techniques are limited in their size as a function of the frequency of interest and at microwave frequencies that would require core diameters to range from many centimeters across to millimeters across in the 10-100 GHz range unlike a TEM transmission line such as coaxial cables. In addition they are limited in bandwidth to a particular frequency band based on the diameter of the waveguide.

Therefore, there remains a need for a flexible coaxial cable and waveguide that is inexpensive and can be scaled down in size below the dimensions of hollow core waveguides, that can be easily fabricated, and that can transmit RF, microwaves or millimeter waves. Moreover, there remains a need for a flexible coaxial cable and wave guide that is made inexpensively, with tight mechanical tolerances, and in which the conductor on the inner and outer surfaces are optionally removed to form a pattern or deposited to form a pattern leaving one or more clear areas. Such patterns can form antenna elements, inductors and other microwave components as well as fashion a port to allow entry and/or egress of high frequency signals through the dielectric without breaching it. Moreover, there remains a need for a flexible coaxial cable and wave guide that can be formed into long lengths and cut into precise short lengths and which can be bundled in various ways, including flexible bundled cables, flexible ribbons and the like, and for which existing manufacturing and cabling and connectorization infrastructure is largely capable of producing with high precision and low cost.

DESCRIPTION OF THE DRAWINGS

FIG. 4 shows a capillary comprising a dielectric material, 400, wherein the capillary is hollow approximately at the center, 405. On the inside wall of the capillary, there is a conductive coating, 410, which is optionally removed to form a pattern, 420, optionally, leaving behind segmented portions of conductive coating, 415. On the outside wall of the capillary, there is a conductive coating, 425, which is optionally removed to form a pattern in the outer conductive coating, 435, and smaller segmented portions of conductive coating, for example, 430. Further, the conductor coated capillary is coated with a dielectric polymer coating, 460, which, in turn, is optionally, coated with a conductor, 445, wherein portions of the conductor are optionally removed to form a pattern in the conductive coating, 465, and smaller segmented portions of conductive coating, 470. In addition, FIG. 4 shows an optional conducting via structure, 440, which electrically connects the conductor, 445, on the outer layer of the dielectric polymer coating, 460, and the conductor, 425, on the outside wall of the capillary. Also shown is an optional conducting via structure, 455, which electrically connects the conductor, 425, in the outside wall of the capillary with the conductor, 410, on the inside wall of the capillary. The via structures, 440 and 455, can be aligned or out of alignment as required. Similarly, the patterns in the conductors can be aligned or out of alignment as required. Moreover, the conductor patterns can have the conductive material removed around the full circumference or on every face or they can be removed partially as required. Moreover, the pattern can be thought of either positively or negatively, so that conductive materials can be deposited in the desired areas or removed from the desired areas. Such patterned and interconnected features enable coaxial or triaxial configurations with patterns and shorts that allow one skilled in the art to produce one or more of antennas, baluns, filters, etc.

FIG. 5A shows a connector, 500, used, in this example, to connect two hollow core coaxial cables. Shown in the figure is the central ferrule, 505, with a longitudinal passage, 510. The capillary, 515, is shown inserted into the longitudinal passage of the ferrule. FIG. 5B shows the body of the ferrule, 505, in cross section, wherein the end face of the ferrule, 520, is optionally capped by a metal ring, 525, also shown in cross section. If the ferrule is a conductor, the metal ring may not be required. Also shown in cross section are the hollow center of the hollow core coaxial cable, 535, the dielectric material of the hollow core coaxial cable, 530, the inner surface of the hollow core coaxial cable coated with a conductor, 540, the outer surface of the hollow core coaxial cable coated with a conductor, 545, configured such that the coated outer surface of the hollow core coaxial cable is in electrical contact with the metal ring, 525, that caps the end of the ferrule. Also shown is a metal insert, 550, in the end of the hollow core coaxial cable. The metal insert is itself hollow. Further shown in FIG. 5B is a second assembly, 555, that is similar to that in 505-550 but configured so as to be face-to-face with the first assembly. When the two ferrule-coaxial cable combinations are brought together, the conductor on the inner surface of the first capillary is brought into electrical contact with the conductor on the inner surface of the second hollow core coaxial cable via their respective metal inserts. In like manner, the conductor on the outer surface of the first hollow core coaxial cable is brought into electrical contact with the conductor on the outer surface of the first hollow core coaxial cable via contact with their respective metal rings on the ferrule end faces or by the ferrule end faces themselves if the ferrule is conductive. FIG. 5C shows a structure similar to FIG. 5B except that the end face of the ferrule, 505, is generally semispherical. The capillary, having a dielectric material, 530, a hollow core, 535, a conductor coated on its inside surface, 540, and its outside surface, 545, is shown cemented into the ferrule with cement, 560. The capillary is shown protruding from the end of the semispherical ferrule so that it can make contact with a mated ferrule. Also shown is a sealant for sealing the end of the capillary, 565.

FIG. 6A shows a ribbon cable made from a plurality of hollow core coaxial cables, 610, surrounded by a sheath which may comprise optional buffer layer, 615, further surrounded by a binder, 620, still further surrounded by an optional strength member, 625, and surrounded by a jacket, 630. FIG. 6B shows a plurality of hollow core coaxial cables, each having an inner surface coated with a conductor, 635. The capillary is made of a dielectric, material, 640, and has an outer surface coated with a conductor, 645. In FIG. 6B the outer surfaces of the hollow core coaxial cables make electrical contact with each other; thus creating a common ground, which may aid in preventing ground loops. Alternatively, as shown in FIG. 6C, there is shown a plurality of hollow core coaxial cables; wherein each hollow core coaxial cable has an inner surface coated with a conductor, 650. The capillary is made of a dielectric, material, 655, and has an outer surface coated with a conductor, 660. The hollow core coaxial cables are each coated with a dielectric sheathing material, 665, which insulates the respective conductors on the outer surfaces of the individual hollow core coaxial cables. In this configuration for example, the independent conductors can provide independent DC power and/or lower frequency signals while the coax provides microwave signals or power transmission. The contiguous portions of the sheathing material on each hollow core coaxial cable can be commingled with that from a neighboring cable to produce a free-standing ribbon or not commingled to produce a loose array.

FIG. 7A shows, in cross section, a bundle of hollow core coaxial cables with a sheath as in FIG. 6, shown here as one layer, 700, individual hollow core coaxial cables, 705, and a central hollow core coaxial cable, 710. Such a package can also be used to provide a cooling loop to remove heat generated when the cables are used to deliver power. In this case, as shown in FIG. 7B, there is a sheath as above, 750, individual hollow core coaxial cables, 755, and a central conduit, 760, that functions as an independent feed tube that provides part or the cooling loop, using fluids such as gases, condensed gases or other cooling liquids, which are returned through the interstitial voids between hollow core coaxial cables, 765, or vice versa. In addition, the center of one or more coax cables can also be used to delivery or receive one or more fluids.

FIGS. 8A and 8B illustrate a further use for hollow core coaxial cables. Shown in FIG. 8A is a hollow core coaxial cable, 800, having a hollow core, 805, a conductor on the inner surface, 810, a conductor on the outer surface, 815, and a dielectric, 825, between the conductors, interfaced to a module that acts as a sensor, transducer or actuator, 820. In one example of its use, a laser is used to provide power to the module, 820, via the hollow core, 805. In this application, the hollow core acts as a waveguide to provide a low-loss power to the module. Shown in FIG. 8B is a hollow core coaxial cable, 850, having a hollow core, 855, a conductor on the inner surface, 860, a conductor on the outer surface, 865, and a dielectric, 875, between the conductors, interfaced to a module that acts as a sensor, transducer or actuator, 870. In one example of its use, a laser is used to provide an optical signal to the module, 870, via the hollow core, 855. In this application, the hollow core acts as a waveguide to provide a low-loss optical signal to the module, 870. The optical signal is converted to an electrical signal and is returned through one or both of the hollow core coaxial cable conductors, 860, 865.

FIG. 9 shows a hollow core coaxial cable, 900, having a hollow core, 905, a conductor on the inner surface, 910, and a conductor on the outer surface, 915, interfaced to a module that acts a sensor, transducer or actuator, 920. In one example of its use, a conducting wire, 925, is used to provide power or a signal to the module, 820. The wire, 925, may be insulated to prevent electrical contact with the conductor on the inner surface of the hollow core coaxial cable, 905.

FIG. 10 shows a bundle of nine hollow core coaxial cables, 1000, with eight of the cables arranged generally on the vertices of an octahedron and one hollow core coaxial cable in the center. Four of the hollow core coaxial cables are selectively switched on, 1005, and five of the hollow core coaxial cables, including the one in the center are selectively switched off, 1010. In this way, the directional properties of an RF signal can be selectively manipulated using the switched array. In the case of the example in FIG. 10, FIG. 10 shows a plot of signal intensity as a function of the angle of azimuth, wherein a directional cardioid pattern is obtained, 1015.

DETAILED DESCRIPTION

Figure 1:
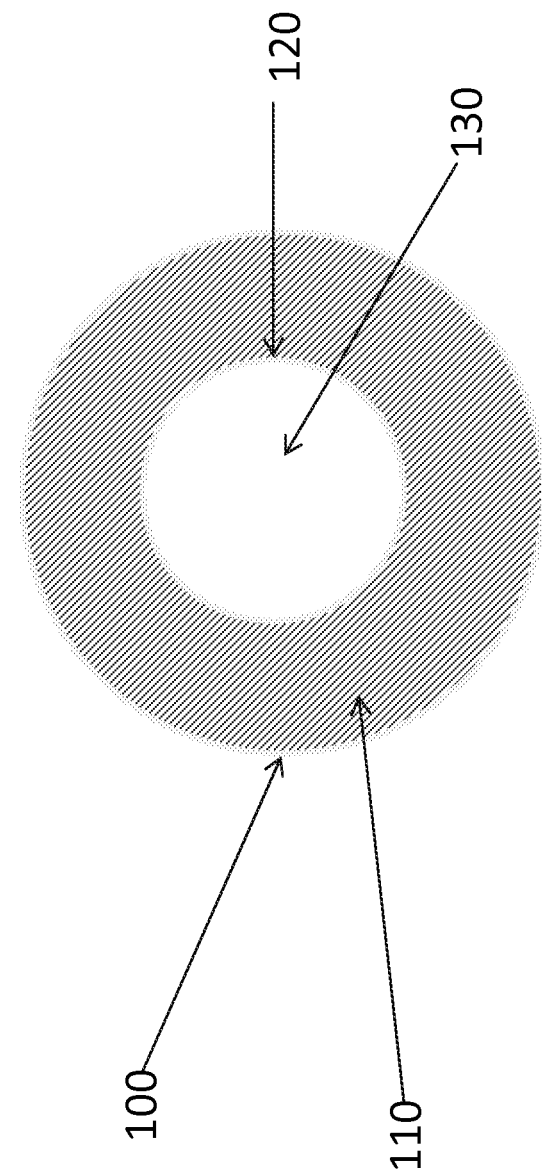
FIG. 1 shows a cross section of a capillary made of a dielectric material, 110, having an inner surface, 120, an outer surface, 100, and a hollow center, 130.

As used herein, the conjunction "and" is intended to be inclusive and the conjunction "or" is not intended to be exclusive unless otherwise indicated. For example, the phrase "or, alternatively" is intended to be exclusive.

As used herein the term dielectric refers to a material property wherein the conductivity of the material is less than about $10^{-10}$ Siemens per meter.

As used herein, when referring to a coating "on" a specific layer, it includes a coating directly onto the specified layer and may include one or more additional layers between the coating and the specified layer.

As used herein the term holey fiber refers to a fiber in which a plurality of holes, channels, capillaries and other voids are distributed evenly or unevenly throughout at least a portion of the fiber.

As use herein term "via" refers to a channel connecting one or more layers

Disclosed and claimed herein are hollow core coaxial cables, comprising a dielectric capillary having at least one inside wall and at least one outside wall, at least one inner conducive layer on the inner wall of the capillary, and at least one outer conductive layer disposed on the outer wall of the capillary.

Further disclosed and claimed herein are methods of making a hollow core high frequency coaxial cable comprising: providing a hollow core dielectric hollow core coaxial cable having an inside wall and an outside wall and a conductor disposed on the inside wall of the hollow core coaxial cable; depositing a conductor on the outside wall of the hollow core coaxial cable.

Further, disclosed and claimed herein are holey fiber coaxial cables, comprising: a holey fiber dielectric capillary having at least one inside wall and an outside wall; an inner conductive layer on the at least one inside wall of the hollow core coaxial cable; and an outer conductive layer on the outside wall of the holey fiber capillary. Holey fiber capillaries have been developed for photonic applications. Where the number of holes is large compared to the wavelength, it is also known as holey fiber or photonic crystal waveguide. In the holey fiber capillary the dielectric constant, as well as the loss due to the dielectric, can be reduced by substantially reducing the effective quantity of dielectric in the cross-section of the coaxial cable. Further the dielectric can be anisotropically distributed in cross-section to produce effects such as polarization maintenance for the propagating waves.

Further disclosed and claimed herein are multiple cables having two or more hollow core coaxial cables forming a ribbon or bundled into a generally round cross section. Selected hollow core coaxial cables of the multiple cable may further be switched. Further disclosed and claimed are methods of non-symmetrically switching the hollow core coaxial cables of the multiple cable to allow creation of a directional antenna which allows for steering RF signal toward a preferred direction.

Various modifications can be made to the hollow core coaxial cable. For example, the dielectric capillary or the holey fiber capillary can have a capillary cross section chosen from circular, oval, elliptical, triangular, square, rectangular, or hexagonal. The cross-section of the inner capillary hole and the outside of the dielectric can be of the same shape or different shapes. For example, without intending to be bound by theory, the inside may be an oval or rectangular to preserve polarization if the inside diameter were used for sub millimeter or terahertz waveguiding. Both the inner conductor and outer conductor may be shaped anisotropically to preserve one or more polarization states for the coaxial cable. Such techniques of formation of custom capillaries are known in the art of drawing optical fibers and capillaries and typically involve first firming a larger scale glass structure, tube, rod or assembly of glass tubes, plates, and rods and to fuse these elements together to form a larger scale preform containing the desired cross-sectional elements. The preform is placed into a chuck in an elevated furnace where a portion of the preform melts and drops. A fiber remains attached between the preform and the molten drop and the glass capillary or fiber is then drawn on a capstan where the rate of pull and rate of feed into of the preform into the furnace are carefully controlled based on feedback from measurements such as outside diameter of the fiber or capillary, which is typically measured using a laser micrometer. Secondary polymer and metal coatings are often applied to the fiber or capillary on the draw tower itself before spooling it.

Further, a selected portion of the inner conductive layer can be removed to form a pattern. Still further, a selected portion of the outer conductive layer can be removed to form a pattern.

Vias through the dielectric of the coaxial cable of various shapes may be made by such method as, for example, machining, etching or removing by laser ablation at selected locations for various reasons such as to allow electrical shorting, fluid flow or a mechanical connection. Such selective removal of the conductive layers and/or dielectrics can enable the integral formation of antennas, impedance transformers, baluns, or enable the integration of mounting regions for switch elements, diodes, or other electrical, mechanical, sensing, or transducing elements.

Means for switching RF signals include mechanical switches, electromechanical switches, optical switches including optical transistors, modular bidirectional switches, coaxial switches, diodes, pin diodes or monolithic microwave integrated circuits (MMIC) and applications specific integrated circuit (ASIC) based circuits, two-position switches, splitters, combiners, line couplers, switch arrays, stacked switch arrays, multiplexers, demultiplexers, electronically and optically switched pin diode arrays, equivalents of the above and combinations of the above. The choice of switching devices or combinations of switching devices used for any particular application depends to a large extent upon the frequency band of interest, power levels of the switched signals, and the speed of switching required.

Still further, the hollow core coaxial cable can have a polymer coating on the outer conductive layer. Still further, the hollow core coaxial cable can have a conductive material disposed on the polymer coating. Still further, a selected portion of the conductive material disposed on the polymer coating can be removed to form a pattern. The dielectric capillary can comprise one or more dielectric materials such as, for example, silica, fused quartz, fused silica, low —OH fused silica, glass, Teflon™, fluoropolymer, borosilicate glass, polyethylene, polytetrafluoroethylene, fluorinated ethylene-propylene, perfluoroalkoxy polyolefin, porous fluoropolymer, polypropylene, nylon 6, nylon 11, silicone rubber, rubber, polyvinyl chloride, polystyrene or other dielectric materials that can be drawn, cast, molded, extruded, and/or otherwise formed. Still further, the inner conductive layer can comprise one or more metals chosen from silver, nickel, copper, gold, platinum, palladium, molybdenum, tungsten, tantalum or titanium. Still further, outer conductive layer can comprise one or more metals chosen from silver, nickel, copper, gold, platinum, palladium, molybdenum, tungsten, tantalum or titanium. Still further, the conductive material disposed on the polymer coating comprises one or more metals chosen from silver, nickel, copper, gold, platinum, palladium, molybdenum, tungsten, tantalum or titanium. Other metals including alloys that are known in the art of deposition through chemical, electrochemical, or vapor deposition means may be chosen.

Further disclosed and claimed herein is a method of making a hollow core high frequency coaxial cable comprising: providing a hollow core dielectric capillary having an inside wall and an outside wall and a conductor disposed on the inside wall of the capillary; and depositing a conductor on the outside wall of the capillary.

Various modifications can be made to the method of making a hollow core high frequency coaxial cable. For example, the method can further comprise removing a selected portion of the conductor disposed on the inside wall of the capillary. Further, the method can further comprise removing a selected portion of the conductor on the outside wall of the capillary. Removing a selected portion of the conductor disposed on the inside wall of the hollow core coaxial cable can be done by such methods as, for example, ablating the conductor disposed on the inside wall of the hollow core coaxial cable with a laser, such as, for example, a carbon dioxide laser, a KrF Excimer laser, an ArF Excimer laser, an F2 excimer laser, a frequency doubled neodymium YAG (yttrium aluminum garnet) laser or a frequency tripled Yb:KYW (ytterbium in a matrix of potassium yttrium tungstate) laser. Removing a selected portion of the conductor on the outside wall of the hollow core coaxial cable can be done by such methods as, for example, ablating a selected portion of the conductor on the outside wall of the hollow core coaxial cable with a laser, such as, for example, carbon dioxide laser, a KrF Excimer laser, an ArF Excimer laser, an F2 excimer laser, a frequency doubled neodymium YAG laser or a frequency tripled Yb:KYW laser. The method can further comprise: applying a photoresist to the conductor on the outside wall of the hollow core coaxial cable; image wise patterning the photoresist; and etching a selected portion of the conductor on the outside wall of the hollow core coaxial cable.

Still further, depositing a conductor on the outside wall of the hollow core coaxial cable is done by one or more of electroless plating, electroplating, sputtering, chemical vapor deposition or atomic layer deposition. Still further, the method can further comprise applying a polymer coating to the conductor on the outside wall of the hollow core coaxial cable. Still further, the polymer coating can be applied by dip coating, spray coating chemical vapor coating or electrophoretic coating. Still further, the method can further comprise depositing a conductor on the polymer coating. Still further, the method can further comprise removing a selected portion of the conductor on the polymer coating. Still further, the dielectric may be etched selectively or patterned using one or more of the methods outlined above such as by laser, patterning and etching, or by mechanical removal.

Figure 2:
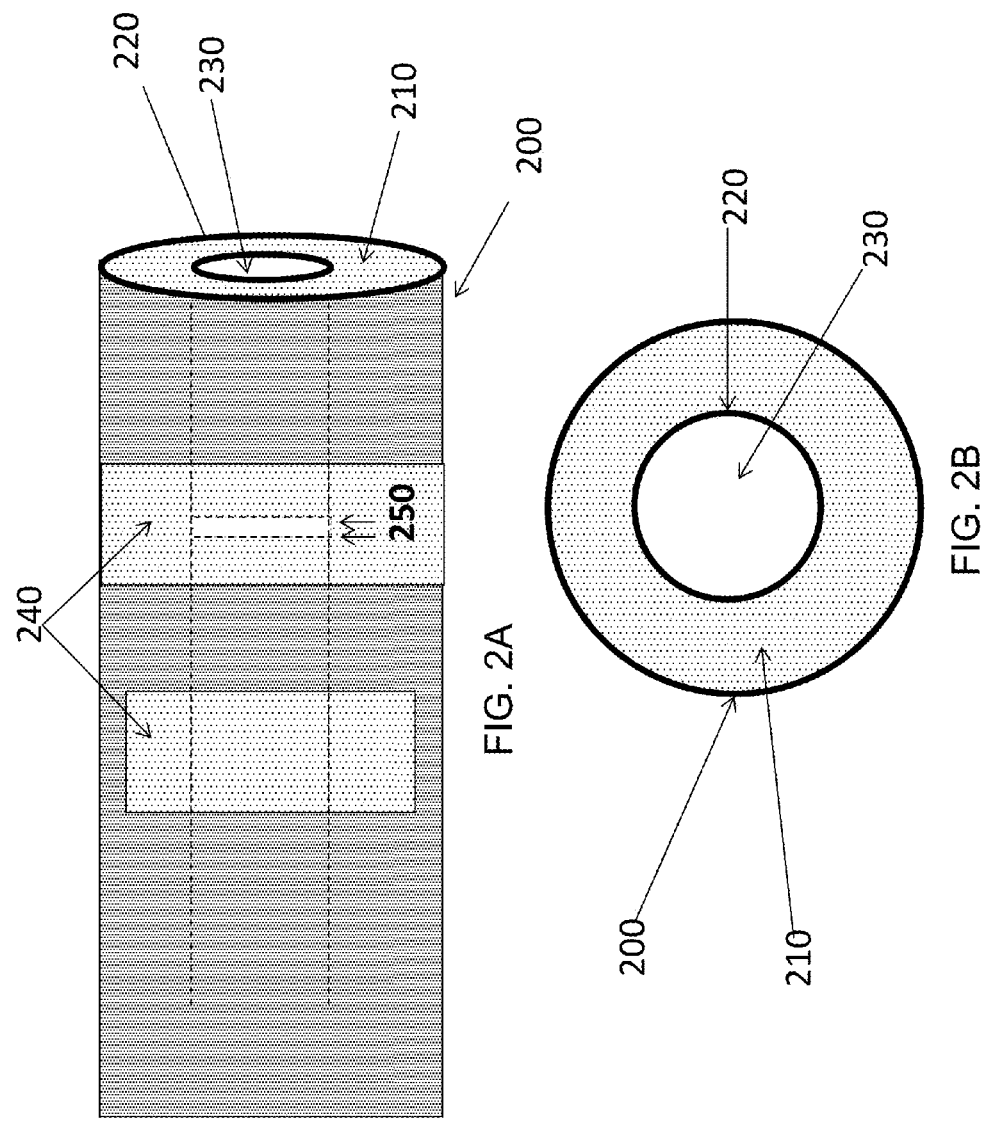
FIGS. 2A and 2B show a capillary similar to that in FIG. 1, both lengthwise (FIG. 2A) and in cross section (FIG. 2B) after the inner and outer surfaces have had conductive materials applied to form a hollow core coaxial cable. Shown in the figure are the conductive inner surface, 220, the conductive outer surface, 200, dielectric material, 210, the hollow portion, approximately at the center, 230. A selected portion of at least one of the outer conductive layer has been removed to form a pattern, 240. Note that the pattern can be completely removed around the circumference of the capillary or only partially removed. In like manner, a portion of the conductive inner surface has been removed, 250.
Figure 3:
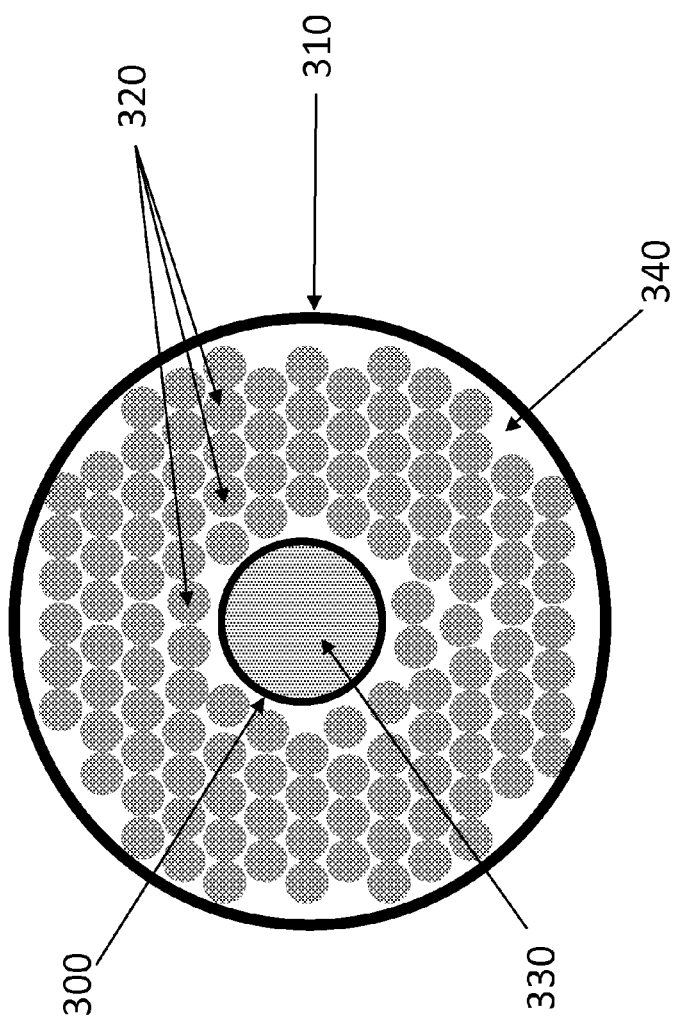
FIG. 3 shows, in cross section, a holey fiber or photonic crystal coaxial cable, having a central capillary, 330, and a plurality of outer capillaries, 320, surrounding the central capillary, wherein all capillaries run approximately parallel to the long axis. The holey fiber coaxial cable is made from a dielectric material, 340. The inner surface of the central capillary is coated with a conductor, 300, and the outer surface of the holey fiber coaxial cable, 310, is also coated with a conductor.
Figure 4:
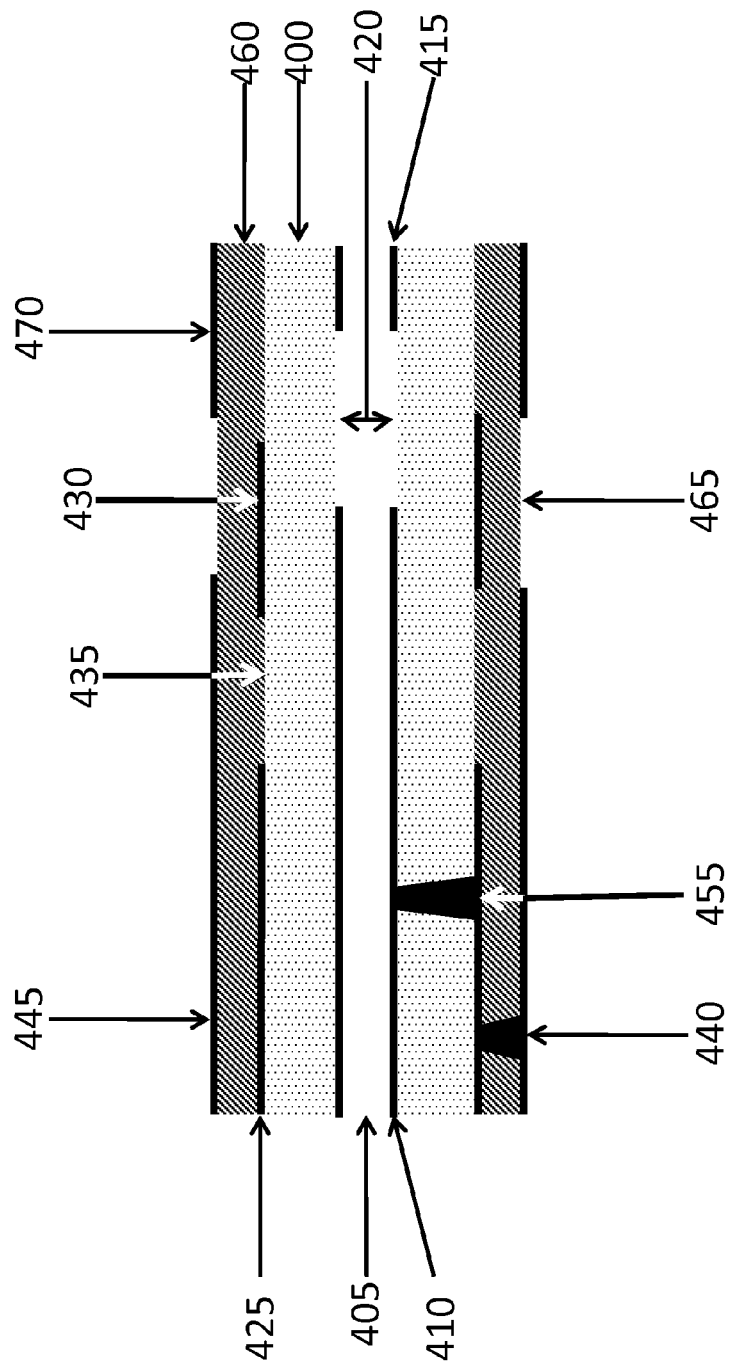
FIG. 4 shows a cross section of a portion of a hollow core coaxial cable similar to that shown in FIG. 2 but with an additional polymer dielectric coating and optional conductor layer, wherein, optionally, selected portions of the conductive layers has been removed to form patterns. Accordingly.
Figure 7B:
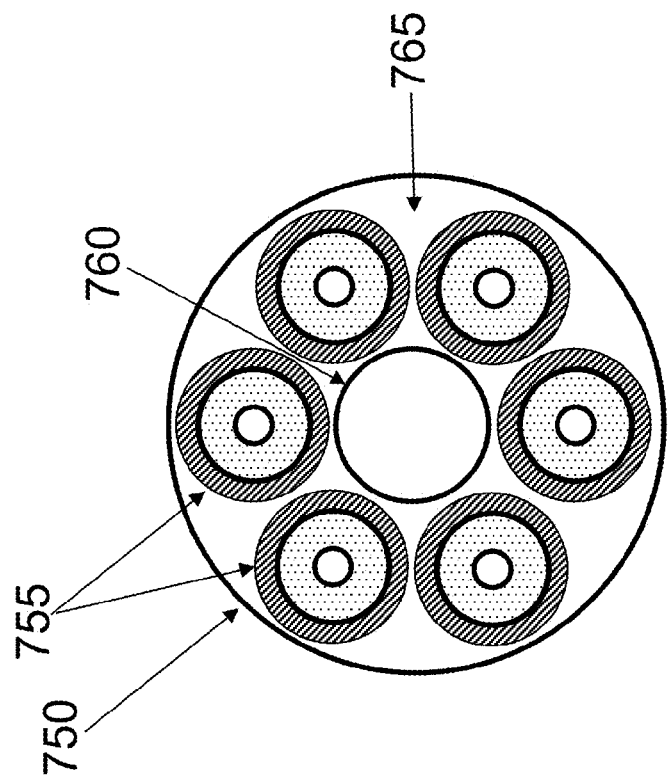
In FIGS. 7A and 7B, such hollow core coaxial cables can be packaged in a larger capillary or tube or jacket.
Figure 7A:
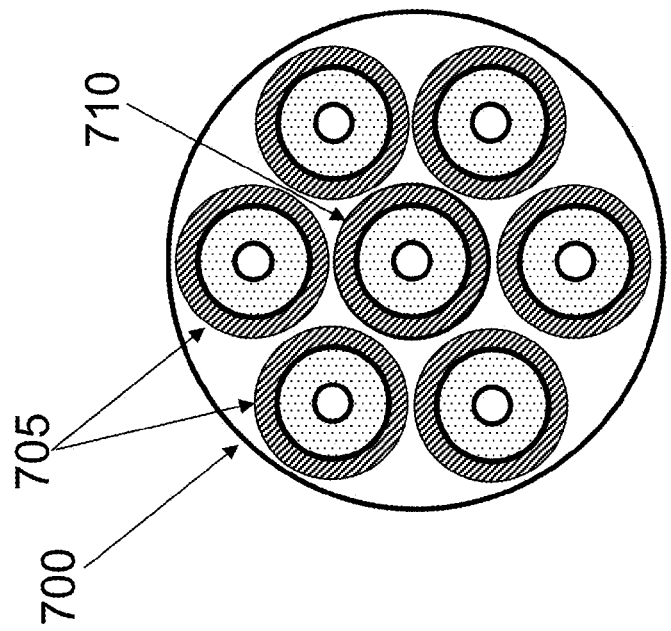
Figure 10:
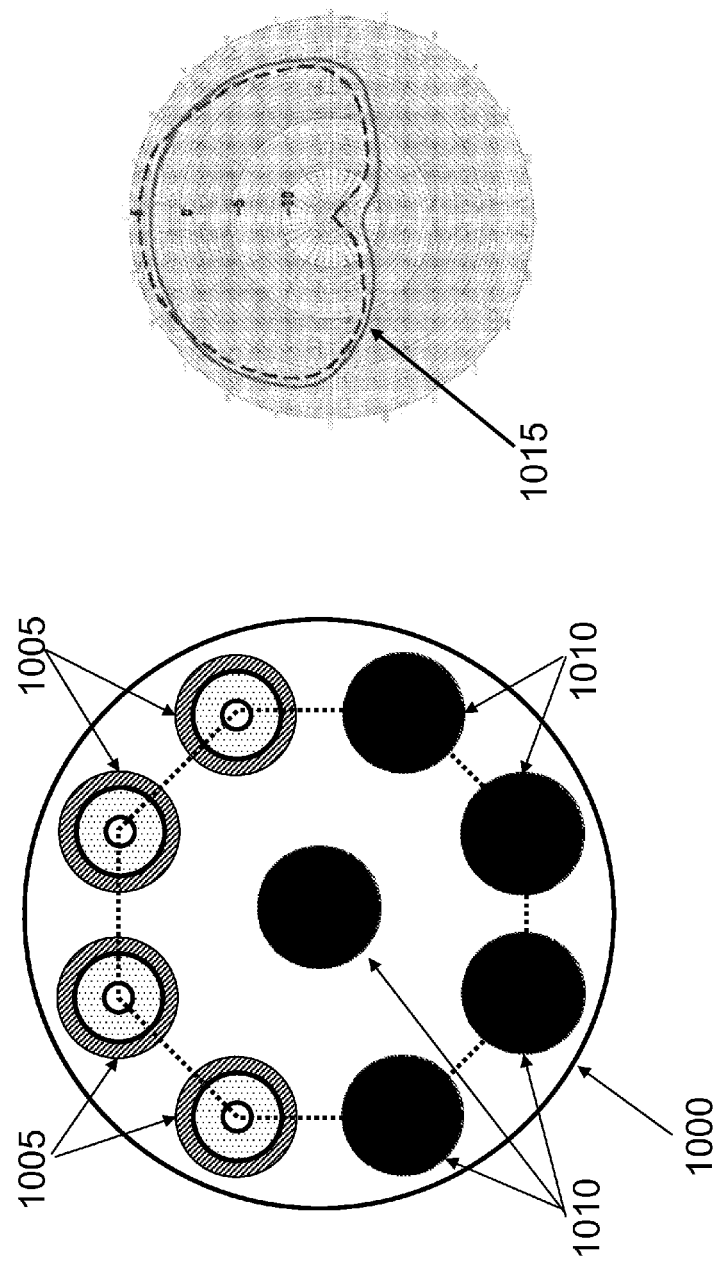
FIG. 10 shows how hollow core coaxial cables can function as switched antennas. For example.

Capillaries and holey finer capillaries are understood to have inside walls and outside walls. Hollow core coaxial cable walls comprise materials that generally function as dielectrics in the desired frequency range. Although the cross sectional shape of the capillaries depicted in FIG. 1-4 are generally round, it is understood that the cross sectional shape can be of any geometry such as square, rectangular or round, symmetrical or non symmetrical, to allow optimization for the application. The capillaries themselves may be porous or may comprise many to thousands of hollow regions reducing the dielectric constant.

Capillaries can have different inner and outer diameters and dimensions, depending on the desired frequency range. When dimensions other than diameters are specified, the measurement is made from flat face to flat face. Capillaries are coated with a polyimide or acrylic coating to give them strength. Coating thickness from about 10 μm (microns) to about 100 μm (microns) can be used. For example, inner diameters or dimensions can be from about 25 to about 700 μm (microns). As a further example, inner diameters or dimensions can be from about 75 to about 400 μm (microns). As a still further example, inner diameters or dimensions can be from about 75 to about 200 μm (microns). For example, outer diameters or dimensions can be from about 100 to about 850 μm (microns). Within that range, outer diameters or dimensions can be from about 100 to about 650 μm (microns). Within that range, outer diameters or dimensions can be from about 100 to about 360 μm (microns).

For this application, a hollow core holey fiber comprises a large center capillary surrounded by a plurality of smaller capillaries, also referred to as the holey cladding. In addition, the holey fiber can have an outer wall of fused silica or other dielectric material. Further the holey fiber may have a polymer coating of acrylic or polyimide. The outside polymer coating may have a thickness of from 10-100 μm (microns). The center capillary can have, for example, a diameter of about 5 to about 150 μm (microns). As a further example, the center capillary can have a diameter 8 to about 100 μm (microns). As a still further example, the center capillary can have a diameter from about 9 to about 75 μm (microns). One useful way to characterize the smaller capillaries is the distance between centers. For example, the distance between centers of the smaller capillaries can be between about 1 to about 20 μm (microns). As a further example, the distance between centers of the smaller capillaries can be between about 1.5 to about 15 μm (microns). As a still further example, the distance between centers of the smaller capillaries can be between about 2 to about 10

μm (microns). A plurality of smaller capillaries surrounds the larger center capillary, forming a holey cladding. One way to characterize the holey cladding in addition to the distance between centers measurement, supra, is the thickness of the holey cladding as measured from the outside of the large center capillary to the edge of the outer wall. For example, the thickness of the holey cladding can be from about 10 to about 200 μm (microns). As a further example, the thickness of the holey cladding can be from about 20 to about 100 μm (microns). As a still further example, the thickness of the holey cladding can be from about 25 to about 75 μm (microns). The thickness of the outer wall can be, for example, from about 10 to about 200 μm (microns). As a further example, the thickness of the outer wall can be from about 15 to about 100 μm (microns). As a still further example, the thickness of the outer wall can be from about 20 to about 50 (microns). The conductor thicknesses on the inside wall of the center capillary and the outside of the outer wall can be the same or different. As an example, conductor thicknesses on the inside wall of the center capillary and the outside of the outer wall can be from about 0.05 to about 20 μm (microns). As a further example, the conductor thicknesses on the inside wall of the center capillary and the outside of the outer wall can be from about 0.5 to about 10 μm (microns). As a still further example, the conductor thicknesses on the inside wall of the center capillary and the outside of the outer wall can be from about 0.75 to about 5 μm (microns). The selection of the metal thickness may depend on the type of metal and the frequency of the signal to be carried.

More than one hollow coaxial cable may be combined to form a ribbon structure or may be bundled in a generally round cross section which can allow for a plethora of singles to propagate at the same time. The hollow core coaxial cables of the multiple cable may be individually switched in a non-symmetrical manner such that a radiation pattern may be generated. The pattern may be detected which would allow for the multiple cable to be directed when the cable is not visible, such as, for example, in the human body as the multiple cable may allow the precise positioning of a probe, a surgical device, an implant or the like. The radiating multiple cable is especially useful when optical methods are hampered such as, for example, when there is a lot of blood that would blind optical devices.

For the purpose of the present disclosure, water is understood to be deionized water, unless otherwise stated, however, deionized water is not required. For the purposes of the present disclosure, conductors generally function as such in the frequency range of interest. The coaxial cables and waveguides, described herein, may or may not be flexible but do function in straight or bent configurations. During plating of the inside wall, temperature is controlled by placing the outside of the hollow core coaxial cable in a water bath having the desired temperature. To heat at temperatures above about 80° C. the hollow core coaxial cable is placed in an oven.

It should be noted that, while the examples describe metal layers as the conductive material, other materials may also be used, such as, for example graphene, carbon nanoparticles, organic conductive materials, such as, for example, polythiophene, polyacetylene, polypyrrole, polyaniline and the like, and other non-metallic conductive materials known in the art.

Plating the interior walls of capillaries can be accomplished by electroless plating, or electroless plating followed by electroplating. These operations are usually accomplished by flowing solutions through the hollow core coaxial cable. In flowing solutions through capillaries, flow rates in ml/min are estimated according to Poiseuille's Equation for a hollow core coaxial cable of circular cross section:

$$\text{Flow Rate} = \frac{\pi \cdot r^4}{8 \cdot \eta \cdot L} \cdot \Delta P = \frac{r^4 \cdot \Delta P}{\eta \cdot L} \cdot 1.625 \times 10^{-8}$$

Where r is the radius in μm, ΔP is the pressure in lb/in², η is the viscosity in centipoise and the length, L is in cm. For cross sections of other geometry, such as square, the radius is conveniently approximated by ½ the average flat-to-flat dimension.

Plating of the interior and exterior walls of capillaries can further be accomplished by chemical vapor deposition (CVD) in which a hot precursor containing the desired metal atom is decomposed to the metal, thermally or in a plasma. For example, Mo, Ta and Ti are deposited by low pressure CVD, from their pentachlorides according to the reaction:

$$2MCl_5 + 5H_2 \rightarrow 2M + 10HCl$$

Tungsten is deposited from tungsten hexafluoride in one of two ways:

$$WF_6 \rightarrow W + 3F_2$$

$$WF_6 + 3H_2 \rightarrow W + 6HF$$

Nickel, molybdenum, and tungsten are deposited at temperatures above about 150° C. from their carbonyl precursors, $Ni(CO)_4$, $Mo(CO)_6$, $W(CO)_6$. Carrier gasses such as argon or nitrogen are used in various concentrations to control the deposition rate and morphology of the metal film.

Gold is deposited from, for example, Trifluorophosphine Gold(I) Chloride, usually, using hydrogen as a carrier gas at temperatures above 110° C. To promote adhesion, another metal such as tantalum or platinum is deposited as a base.

Palladium is deposited from, for example, palladium(II) acetate at 200-300° C., using $H_2$/He as a carrier gas.

Platinum is deposited from, for example, trimethyl(ethylcyclopentadienyl)platinum $(C_2H_5C_5H_4)Pt(CH_3)_3$, at temperatures above about 150° C., using argon as a carrier gas.

In use, signals can enter or be transmitted out of the waveguide conductively by direct coupling or through one or more openings in the conductive coatings, optimized for the particular frequency in use.

Pretreatment of fused quartz or silica inside and outside surfaces can be accomplished using a solution of sodium hypophosphite (about 100 gm/liter, buffered to pH 6-7 having a citrate or pyrophosphate buffer). Aqueous solutions of the organic boranes are also suitable such as dimethylamine borane, trimethylamine borane, diethylamine borane, triethylamine borane and pyridine borane. A suitable non-aqueous reductant solution, such as, for example di-isobutylaluminum hydride in hexane can also be used. Reducing gases may also be used such as hydrogen and carbon monoxide, optionally, with heating above about 100° C. Optionally, a dilute solution of buffered hydrofluoric acid (20/1 to 40/1 dilution of the standard etching solution with dionized or distilled water).

The following examples use glass or fused quartz capillaries or holey fibers. Polymer capillaries, available from Paradigm Optics can also be used within the scope of this invention. Polymer materials used can be made of polyethylene, polyvinyl chloride, polytetrafluoroethylene, polycarbonates such as polyethylene teraphthalate, polyperfluoroalkoxy ethylene (PFA), and other fluorinated and non fluorinated polymers. Pretreatment of polymer based capillaries' inside and outside surfaces can be accomplished using a solution of sulphochromic acid at room temperature for a period of 20 minutes. Follow-on pretreatment can optionally be accomplished using a solution of sodium hypophosphite (about 100 gm/liter, buffered to pH 6-7 having a citrate or pyrophosphate buffer). Aqueous solutions of the organic boranes are also suitable such as dimethylamine borane, trimethylamine borane, diethylamine borane, triethylamine borane and pyridine borane. A suitable non-aqueous reductant solution such as, for example, di-isobutylaluminum hydride in hexane can also be used. Reducing gases may also be used such as hydrogen and carbon monoxide, optionally, with heating above about 100° C.

EXAMPLES

All examples are hypothetical.

Solution A: The following solution is used to prepare surfaces such as silica and related materials, prior to the application of the electroless plating solutions: A solution of sodium hypophosphite is prepared (about 100 g/dm$^3$ sodium hypophosphite in water, buffered to pH 6-7 using a pyrophosphate buffer).

Solution B: The following is used as a sensitizing agent for electroless plating: A solution of $SnCl_2$/HCl in dionized water ($SnCl_2$, 70 g/dm$^3$, HCl (concentrated~37%), 40 g/dm$^3$) is prepared.

Solution C: The following is used as an activating agent for electroless plating: A solution of $PdCl_2$/HCl in deionized water ($PdCl_2$, 1 g/dm$^3$, HCl (concentrated ~37%), 5 ml/dm$^3$) is prepared.

Solution D: The following is used as a silver-Plating precursor: These materials are dissolved on order in a small amount of water: $AgNO_3$ (5 g), dodecylbenzene sulfonic acid sodium salt (30 mg), aqueous ammonia solution (concentrated ~28%, 25 ml). To the resulting solution, glacial acetic acid is added so that the final pH is reduced to 6-9. The volume of the solution is then increased to about 100 ml by adding deionized water so that the $Ag^+$ concentration is about 0.3 mole/dm$^3$.

Solution E: The following is used as a reducer solution: A 3 mole/dm$^3$ aqueous stock solution of hydrazine hydrate ($NH_2HN_2$—$H_2O$) is diluted with deionized water to give a concentration of about 0.3 moles/dm$^3$ solution.

Solution F: The following is used as a silver electroless plating solution: Solution D precursor (25 ml) and Solution E reducer (6 ml) are blended and diluted with water to make 100 ml of solution. The resulting solution is used immediately.

Solution G: The following is used as an alternative reducer solution: A 3 mole/dm$^3$ aqueous stock solution of an aldose sugar reducing agent such as glucose is diluted with deionized water to give a concentration of about 0.3 moles/dm$^3$ solution. In this example, allose, altrose, mannose, gulose, idose, galactose, or talose can also be used in place of glucose. Moreover, lower molecular weight sugars such as glycolaldehyde, glyceraldehydes, erythrose, threose, ribose, arabinose, xylose, or lyxose can be used in the same molar proportion as well as formaldehyde in the same molar proportion.

Solution H: The following is used as a silver electroless plating solution: Solution D precursor (25 ml) and Solution G alternative reducer (using glucose as the aldose sugar reducing agent, 6 ml) are blended and diluted with water to make 100 ml of solution. The resulting solution is used immediately.

Solution I: The following is used as a nickel electroless plating solution, suitable for plating at a temperature of 30-60° C. for example, about 54° C. to give a thickness of 0.75 μm: One (1) part sodium fluoride, 80 parts sodium succinate, 100 parts nickel sulfate, and 169 parts sodium hypophosphite are combined with 500 parts deionized water.

Solution J: The following is used as a copper electroless plating solution suitable for plating at a temperature of 25-60° C. for example, about 54° C.: To 250 ml of water are added, with stirring, cupric sulfate ($CuSO_4$-$5H_2O$—7.5 g), triethanolamine ($N(CH_2CH_2OH)_3$— 5.0 g), sodium hydroxide (NaOH sufficient to give a pH of 13.5—about 20 g), sodium cyanide (NaCN—0.5 g), formaldehyde, 40% in water ($H_2CO$—40.0 g), water to make 1 dm$^3$.

Solution K: The following is used as a copper electroless plating solution suitable for plating at a temperature of 25-40° C. for example, about 32° C.: To 250 ml of water are added, with stirring, cupric sulfate ($CuSO_4$-$5H_2O$—1.0 g), potassium sodium tartrate ($NaKC_4H_4O_6$ —2.7 g), sodium hydroxide (NaOH sufficient to give a pH of 13.5—about 20 g), sodium cyanide (NaCN—0.05 g), formaldehyde, 40% in water ($H_2CO$—35.0 g), water to make 1 dm$^3$.

Example 1

In this hypothetical example, a fused silica hollow core coaxial cable of generally square cross section, with an inner dimension of about 100 μm (measured flat to flat), an outer dimension of about 300 μm (measured flat to flat), a length of 10 cm, and coated with a polyimide coating such that the outer dimension of the coating is about 383 μm, and wherein a portion of the polyimide coating is removed to reveal a bare segment of hollow core coaxial cable of length 0.5 cm, and wherein the bare segment of hollow core coaxial cable has coated segments on either lengthwise side, is provided by Polymicro Technologies, of Phoenix, Ariz. Solution A is urged through the capillary from a reservoir using a peristaltic pump, adjusted so that the average pressure is about 150 lb/in$^2$ to achieve a flow rate of approximately 1.0 ml/min for a period of about 10 min. Times are from first emergence from the hollow core coaxial cable. In like manner, successive solutions are urged through the hollow core coaxial cable according to Table 1:

TABLE 1

| Solution | Flow Rate, ml/min | Time, min | Temperature, ° C. |
|---|---|---|---|
| Water rinse | 1.0 | 10-20 | 25 |
| Solution B | 1.0 | 5 | 25 |
| Water rinse | 1.0 | 10-20 | 25 |
| Solution C | 1.0 | 3 | 25 |
| Water rinse | 1.0 | 10-20 | 25 |
| Solution F | 1.0 | 5 | 15-30 |
| Water rinse | 1.0 | 10-20 | 25 |

Example 2

Similar to example 1 except that the silver plating solution is Solution H instead of solution F.

Example 3

Similar to example 1 except that the plating solution is Solution I at a temperature of 54° C. instead of solution F, to produce a hollow core coaxial cable with nickel plated on the inside wall.

Example 4

Similar to example 1 except that the plating solution is Solution J at a temperature of 54° C. instead of solution F, to produce a hollow core coaxial cable with copper plated on the inside wall.

Example 5

Similar to example 1 except that the plating solution is Solution K at a temperature of 32° C. instead of solution F, to produce a hollow core coaxial cable with copper plated on the inside wall.

Examples 6-10

Any one of examples 1-5, having a portion of the protective polyimide coating removed from the exterior wall of the hollow core coaxial cable, as described supra, is chosen. Removal of a portion of the conductive coating on one or more of the interior walls is accomplished by laser ablation using a 248 nm pulsed excimer laser, such as the Lumonics PM800 laser (300 mJ, 1-30 W), although other lasers and wavelengths may also be used. In these examples, the flatness of the faces of the capillaries enables selective ablation of conductive material from one or more selected sides.

Examples 11-20

Any one of examples 1-10 having a polyimide coating on some portion of the exterior wall of the capillary is chosen and the ends of the hollow core coaxial cable are sealed with an epoxy-based formulation, such as SmartGel™, available from Nye optical Products of Fairhaven, Mass. The outer wall of the hollow core coaxial cable is treated repeatedly with concentrated sulfuric acid at 100-130° C. to remove the polyimide coating and rinsed with deionized water. After rinsing, the hollow core coaxial cable is placed in successive baths to plate the outer surface at times and temperatures according to Table 2:

TABLE 2

| Solution | Time, min | Temperature, ° C. |
|---|---|---|
| Solution B | 5 | 25 |
| Water rinse | 10-20 | 25 |
| Solution C | 3 | 25 |
| Water rinse | 10-20 | 25 |
| Solution F | 5 | 15-30 |
| Water rinse | 10-20 | 25 |

After plating, the metal clad hollow core coaxial cable is optionally coated with a protective polyimide, acrylic or electrodeposited photoresist coating or subjected to further processing.

Examples 21-30

Similar to examples 11-20, except that the plating solution is Solution I at a temperature of 54° C. instead of solution F, to produce a hollow core coaxial cable with nickel plated on the outside wall.

Examples 31-40

Similar to examples 11-20, except that the plating solution is Solution J at a temperature of 54° C. instead of solution F, to produce a hollow core coaxial cable with copper plated on the outside wall.

Examples 41-50

Similar to examples 11-20, except that the plating solution is Solution K at a temperature of 32° C. instead of solution F, to produce a hollow core coaxial cable with copper plated on the outside wall.

Examples 51-90

The hollow core coaxial cable of any one of examples 11-50 is chosen. Removal of the metal coating from a portion of one or more of the exterior walls is accomplished by laser ablation using a 248 nm pulsed excimer laser, such as the Lumonics PM800 laser (300 mJ, 1-30 W), although other lasers and wavelengths may also be used. In these examples, the flatness of the faces of the capillaries enables selective image wise ablation of metal from one or more sides. Moreover, the open area created by ablation can be aligned with the ablated portions of the interior wall so that the open areas overlap or are masked respectively, as required for the particular use contemplated. Optionally, to protect the hollow core coaxial cable, a polymer coating can be disposed on the outside of the hollow core coaxial cable such as a polyimide or an acrylic or an electrodeposited resist, a suitable example of which is EAGLE™ 2100 ED Negative acting electrodeposited photoresist, along with its ancillary developer, EAGLE™ 2005 developer, available from the Dow Chemical Company. The resist is applied by direct current cataphoretical electro-deposition at a direct current potential of 70 Volts, bath temperature 45° C., baked at 100° C. for 20 minutes and may be bulk or image-wise photo-cured at a wavelength of 365 nm and a dose of 300-800 mJ/cm$^2$, depending on the thickness of the coating.

Examples 91-95

Similar to examples 1-5 except that the polyimide coated hollow core coaxial cable is circular in cross section with a length of 20 cm, an inner diameter of about 150 μm, and the pressure is about 95 lb/in$^2$, and adjusted to give a flow rate of about 1.5 ml/min, available from Polymicro Technologies, of Phoenix, Ariz. As above, this hollow core coaxial cable has a portion of its polyimide coating removed such that a bare segment of hollow core coaxial cable is visible with coated segments on either lengthwise side.

Examples 96-100

Similar to examples 6-10 except that any one of examples 91-95, having a portion of the protective polyimide coating removed from the exterior wall of the hollow core coaxial cable, as described supra, is chosen. Image wise removal of a portion of the metal coating the interior wall of the hollow core coaxial cable is accomplished by laser ablation using a 248 nm pulsed excimer laser, such as the Lumonics PM800 laser (300 mJ, 1-30 W), although other lasers and wavelengths may also be used.

Examples 101-110

Similar to examples 11-20 except that the capillaries from examples 91-100 are used.

Examples 111-120

Similar to examples 101-110, except that the plating solution is Solution I at a temperature of 54° C. instead of solution F, to produce a hollow core coaxial cable with nickel plated on the outside wall.

Examples 121-130

Similar to examples 101-110, except that the plating solution is Solution J at a temperature of 54° C. instead of solution F, to produce a hollow core coaxial cable with copper plated on the outside wall.

Examples 131-140

Similar to examples 101-110, except that the plating solution is Solution K at a temperature of 32° C. instead of solution F, to produce a hollow core coaxial cable with copper plated on the outside wall.

Examples 141-180

The hollow core coaxial cable of any one of examples 101-140 is chosen. Image-wise removal of the metal coating from a portion of the exterior walls is accomplished by laser ablation using a 248 nm pulsed excimer laser, such as the Lumonics PM800 laser (300 mJ, 1-30 W), although other lasers and wavelengths may also be used. In these examples, the circular cross section geometry of the hollow core coaxial cable does not enable selective image wise laser ablation from individual faces. The open area created by ablation can be aligned with the ablated portions of the interior wall so that the open areas overlap or are masked respectively, as required for the particular use contemplated. Optionally, to protect the hollow core coaxial cable, a polymer coating can be disposed on the outside of the hollow core coaxial cable such as a polyimide or an acrylic or an electrodeposited resist, a suitable example of which is EAGLE™ 2100 ED Negative acting electrodeposited photoresist, along with its ancillary developer, EAGLE™ 2005 developer, available from the Dow Chemical Company. The resist is applied by direct current cataphoretical electrodeposition at a direct current potential of 70 Volts, bath temperature 45° C., baked at 100° C. for 20 minutes and may be bulk or image-wise photo-cured at a wavelength of 365 nm and a dose of 300-800 mJ/cm$^2$, depending on the thickness of the coating.

Example 181

Any one of the polymer coated capillaries described in Examples 51-90 or 141-180 can be used. The surfaces of the polymer coatings are treated using a dilute solution of sulphochromic acid at room temperature for a period of 20 minutes. Pretreatment is continued using a solution of sodium hypophosphite (about 100 gm/liter, buffered to pH 6-7 with a pyrophosphate buffer). After rinsing thoroughly with deionized water, the polymer coated hollow core coaxial cable is placed in successive baths to plate the outer surface at times and temperatures according to Table 2. This produces a hollow core coaxial cable with three layers of metal.

Example 182

The hollow core coaxial cable with three layers of metal of example 181 is subject to image wise laser ablation as described in Examples 141-180 so that a portion of the metal coating is ablated.

Example 183

A glass hollow core coaxial cable of 300 µm inner diameter and 400 µm outer diameter and a silver coating on the inside surface of about 10 µm of thickness and an acrylic coating on the outside surface of 175 µm of thickness (total outer diameter of about 750 µm) is provided by Polymicro Technologies, of Phoenix, Ariz. The acrylic coating is removed with a gentle stream of acetone and the ends of the hollow core coaxial cable sealed with epoxy. The outer surface of the glass of the glass hollow core coaxial cable is treated using a solution of sodium hypophosphite (about 100 gm/liter, buffered to pH 6-7 with a pyrophosphate buffer) and rinsed thoroughly with water. Thereafter, the outer surface of the hollow core coaxial cable is treated sequentially with the solutions as in Table 2. A polymer coating is disposed on the coaxial cable thus formed as described in, for example, Examples 141-180. Optionally, the outer polymer coating can be coated once again with metal as described supra in Example 181.

Example 184

A glass hollow core coaxial cable of 300 µm inner diameter and 400 µm outer diameter and a silver coating on the inside surface of about 10 µm of thickness and an acrylic coating on the outside surface of 175 µm of thickness (total outer diameter of about 750 µm) is provided by Polymicro Technologies, of Phoenix, Ariz. A portion of the acrylic coating is removed with a gentle stream of acetone. The silver plated on the inner surface is then ablated image-wise as described supra in Examples 96-100. The ends of the hollow core coaxial cable sealed with epoxy. The outer surface of the glass of the glass hollow core coaxial cable is treated using a solution of sodium hypophosphite (about 100 gm/liter, buffered to pH 6-7 with a pyrophosphate buffer) and rinsed thoroughly with water. Thereafter, the outer surface of the hollow core coaxial cable is treated sequentially with the solutions as in Table 2. Optionally, a portion of the silver on the outer surface is ablated image-wise as described in Examples 141-180. A polymer coating is disposed on the coaxial cable thus formed as described in, for example, Examples 141-180. Optionally, the outer polymer coating can be coated once again with metal as described supra in Example 181 and portions of the metal removed image-wise from the outer surface of the polymer coating.

Example 185

Plating both the inside and outside surfaces: The hollow core coaxial cable is laid out in a vessel so that both open ends are covered when subjected to the desired solution at the desired temperature. The solution is poured into the vessel and the vessel placed into a vacuum chamber. A vacuum of about 15 mm of mercury or less is applied so that the fluid infuses the inside of the hollow core coaxial cable. The vessel is removed from the vacuum chamber, and allowed to stand for the prescribed amount of time. The hollow core coaxial cable is turned on end and placed on an absorbent mat so that the infused solution is drawn out. The hollow core coaxial cable is rinsed with dionized water several times in the vacuum chamber as above and subjected to treatment with the next solution or dried, as required. In this way, it is possible to simultaneously plate the insides and outsides of one or more capillaries.

Example 186

Thus a glass hollow core coaxial cable of 75 µm inner diameter is pretreated with Solution A according to the method of Example 185 and rinsed thoroughly according to the method of Example 185. Thereafter, in similar fashion, successive solutions are applied as shown in Table 2.

Example 187

By way of example, a holey fiber capillary coaxial cable is fabricated in the following way. A fused optical grade holey fiber with individual capillaries of about 100 μm and with lapped or cleaved ends is obtained from Newport Corporation of Irving, Calif. or NKT Photonics of Denmark. A plurality of individual capillaries in the holey fiber is obscured using an epoxy-based formulation such as Smart-Gel™, available from Nye optical Products of Fairhaven, Mass. The holey fiber is placed in a high pressure jig, fitted with an o-ring assembly such that the obscured portions of the holey fiber face are on the upstream side of the jig. Solution A is urged through the remaining channels of the holey fiber from a reservoir using a peristaltic pump, adjusted so that the average pressure is about 150 lb/in$^2$ to achieve a flow rate of approximately 1.0 ml/min for a period of about 10 min. Times are from first emergence from the hollow core coaxial cable. In like manner, successive solutions are urged through the hollow core coaxial cable according to Table 1. Once the selected inner walls of the holey fiber, are coated with conductor and dried, the ends are fully sealed with SmartGel™ as above. After the Smart-Gel™ is cured, the hollow core coaxial cable is placed in successive baths to plate the outer surface at times and temperatures according to Table 2. The obscured ends of the holey fiber are then cut using a precision blade. The holey fiber coaxial cable is ready for use or further processing.

Example 188

Without intending to be bound by theory, the results of simulations of dielectric loss for a holey fiber capillary coaxial cable wherein the conductor thickness is 1 μm (micron) and the length is 30 cm are shown in Table 3.

TABLE 3

| Frequency, gHz | Inside Wall, Dia., μm | Outside Wall Dia., μm | Dielectric Loss, dB |
|---|---|---|---|
| 0.915 | 100 | 500 | ~0.7 |
| 0.915 | 200 | 1000 | ~0.4 |
| 2.45 | 100 | 500 | ~1.05 |
| 2.45 | 300 | 1000 | ~0.6 |

Although the present invention has been shown and described with reference to particular examples, various changes and modifications which are obvious to persons skilled in the art to which the invention pertains are deemed to lie within the spirit, scope and contemplation of the invention.

What is claimed is:

1. A hollow core coaxial cable, comprising:
   a. a dielectric capillary having an inside wall and an outside wall providing a hollow core extending along a central axis thereof, the capillary having an inner dimension of 700 μm or less and an outer dimension of 850 μm or less;
   b. an inner conductive layer disposed on the inside wall of the capillary; and
   c. an outer conductive layer disposed on the outside wall of the capillary, the dielectric capillary, inner conductive layer, and outer conductive layer disposed coaxial to one another;
   whereby the materials and dimensions of the dielectric capillary, inner conductive layer, and outer conductive layer cooperate to provide a flexible, hollow core, coaxial cable.

2. The hollow core coaxial cable of claim 1, wherein the inner conductive layer has a thickness of 20 μm or less.

3. The hollow core coaxial cable of claim 1, wherein the outer conductive layer has a thickness of 20 μm or less.

4. The hollow core coaxial cable of claim 1, wherein a selected portion of the inner conductive layer has been removed to form a pattern.

5. The hollow core coaxial cable of claim 4, wherein a selected portion of the outer conductive layer has been removed to form a pattern.

6. The hollow core coaxial cable of claim 1, wherein a selected portion of the outer conductive layer has been removed to form a pattern.

7. The hollow core coaxial cable of claim 1, comprising a conductive via disposed and electrically connected between the inner and outer conductive layers at a location where a selected portion of the dielectric capillary has been removed.

8. The hollow core coaxial cable of claim 7, wherein the via between the conductive layers comprises an electrical connection between the conductive layers.

9. The hollow core coaxial cable of claim 1, comprising a polymer layer disposed on the outer conductive layer and an additional conductive layer disposed on the polymer layer.

10. The hollow core coaxial cable of claim 9, comprising a conductive via disposed and electrically connected between the additional conductive layer and outer conductive layer at a location where a selected portion of the polymer layer has been removed.

11. The hollow core coaxial cable of claim 1, comprising a polymer layer disposed on at least one of the conductive layers.

12. The hollow core coaxial cable of claim 1, comprising a polymer layer disposed between one of the conductive layers and the dielectric capillary.

13. The hollow core coaxial cable of claim 1, comprising a holey cladding surrounding the hollow core coaxial cable.

14. A multiple cable comprising a plurality of the hollow core coaxial cables of claim 1, wherein the plurality of hollow core coaxial cables form a ribbon or a bundle, and comprising a switch for switching signals into selected ones of the hollow core coaxial cables of the multiple cable.

15. A method of use the multiple cable of claim 14, comprising providing RF signals to a non-symmetrical number of hollow core coaxial cables.

16. A method of use the multiple cable of claim 15, comprising non-symmetrically switching the hollow core coaxial cables to provide a directional antenna for steering an RF signal toward a preferred direction.

17. A method of making the hollow core coaxial cable of claim 1, comprising:
   a. providing a hollow core dielectric capillary having an inside wall and an outside wall and a conductor layer disposed on the inside wall of the capillary and,
   b. depositing a conductor layer on the outside wall of the capillary.

18. The method of claim 17, wherein depositing the conductor on the outside wall of the capillary is done by one or more of electroless plating, electroplating, sputtering, chemical vapor deposition or atomic layer deposition.

19. The method of claim 17, further comprising applying a polymer layer to the conductor layer of the outside wall of the capillary.

20. The method of claim 19, wherein the polymer layer is applied by dip coating, spray coating chemical vapor coating or electrophoretic coating.

* * * * *